Oct. 7, 1941.   W. N. EDWARDS   2,258,177
ROD OR CABLE GUIDE
Filed Feb. 16, 1939   2 Sheets-Sheet 1

INVENTOR.
William Neal Edwards.
BY Murray Sackhoff & Paddack.
ATTORNEYS.

Oct. 7, 1941.  W. N. EDWARDS  2,258,177
ROD OR CABLE GUIDE
Filed Feb. 16, 1939  2 Sheets-Sheet 2
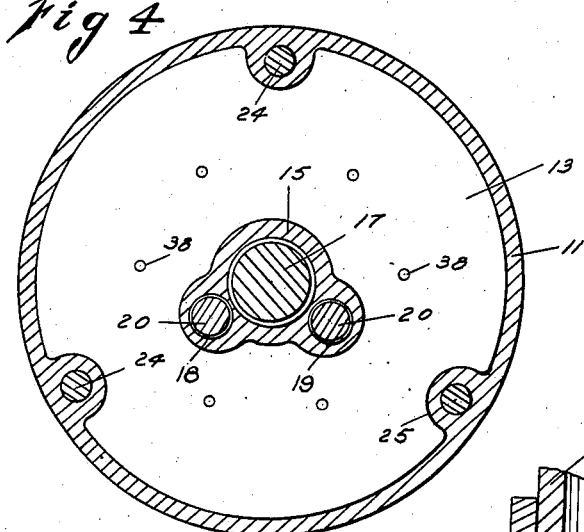
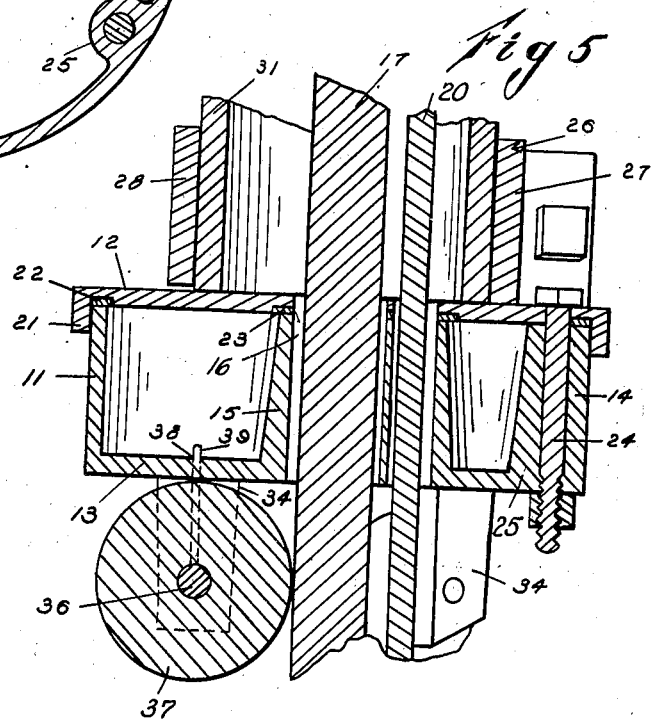
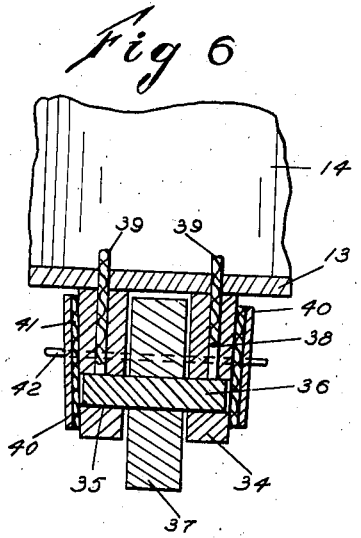
INVENTOR.
William Neal Edwards.
BY Murray Sackhoff & Paddach,
ATTORNEYS.

Patented Oct. 7, 1941

2,258,177

UNITED STATES PATENT OFFICE 2,258,177

ROD OR CABLE GUIDE

William Neal Edwards, White Deer, Tex.

Application February 16, 1939, Serial No. 256,775

10 Claims. (Cl. 308—6)

This invention relates to a rod or cable guide.

An object of the invention is to provide a friction-free guide adapted to have a rod, cable or other similar moving member pass therethrough with a minimum of resistance.

Another object is to provide a guide of this kind constructed with rollers and means whereby the latter are automatically oiled.

Another object is the provision of such a guide of simple construction having a minimum of parts and adapted to give access to the interior thereof by simple and quickly adjusted means.

These and other objects are attained by the means described herein and illustrated in the accompanying drawings, in which:

Fig. 4 is a transverse cross-sectional view through the oil chamber portion of the base of the guide.

Fig. 5 is a cross-sectional view on the line 5—5 of Fig. 3.

Fig. 6 is a fragmental cross-sectional view through one of the rollers forming a part of the guide and its associated bearing and oiling details.

Figure 1:
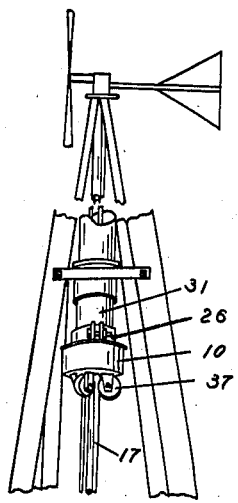
Fig. 1 is a perspective view of the guide means of the present invention associated with a windmill of the type used in oil fields, the mill being shown fragmentally.

The guide of the present invention is adapted for a wide variety of uses, its use in connection with a windmill of the oil-field type, as illustrated herein, being merely one example of its practical application. In all instances where a moving rod or cable is made use of, particularly for a transmission of power, it is highly desirable to avoid and to reduce to a minimum all frictional contact of the rod or cable with adjacent objects or parts. This is particularly true of power or rod lines such as those used in oil fields for transmitting power to a number of different wells from one power house. Under circumstances of this kind, it will be readily understood that frictional contact against the various cables wastes a considerable amount of power and that the elimination of such waste represents a saving of time, expense and equipment.

The present invention attains this objective in an effective manner by providing briefly, a base apertured for passage therethrough of the rod or cable and having rollers mounted thereon in such relation as to embrace the rod or cable so as to hold it free of contact with the base and with adjacent objects. The base, according to this invention, is formed with an oil chamber and with oil-feeding means whereby the rollers are constantly lubricated automatically.

In greater detail and with reference to the drawings: the guide of this invention may be of circular form and is shown as comprising a base 10 made up of a chambered body portion 11 and a removable cover 12. The body comprises a bottom 13 and side wall 14. A core 15, which may be formed integral with the bottom 13, extends upwardly within the body 11 to a height equal to the side wall 14. As herein shown, the core 15 is formed with a bore or aperture 16 adapted for passage therethrough of a rod or cable 17. The core 15 may likewise be provided with eccentrically disposed bores 18 and 19 for the reception of auxilliary cables or rods 20 such as those utilized in operating a latch mechanism of the kind shown in my Patent No. 2,135,209 of November 1, 1938. These auxiliary bores and cables are not necessarily associated with the guide of the present invention.

The cover 12 is preferably formed with a flange 21 (Fig. 5) adapted to embrace the upper portions of the side wall 14 of the body. Where the cover rests upon the edges of the side wall 14, a gasket 22 is preferably positioned in a groove on the interior face of the cover. In the central portions of the interior face of the cover, the latter is also preferably formed with a recess to receive a gasket 23 adapted to rest against the top edge of the core 15.

The cover is held to the body of the guide by means of bolts 24 passing through integrally formed lugs 25 in the body 11. The gaskets 22 and 23 may be of a thickness double the depth of their associated grooves and the relationship of the cover and body of the guide is such as to transmit stresses to the cover 12 and the lugs 25, and this, in turn, prevents the pressure of the bolts 24 from cutting the gaskets.

Figure 3:
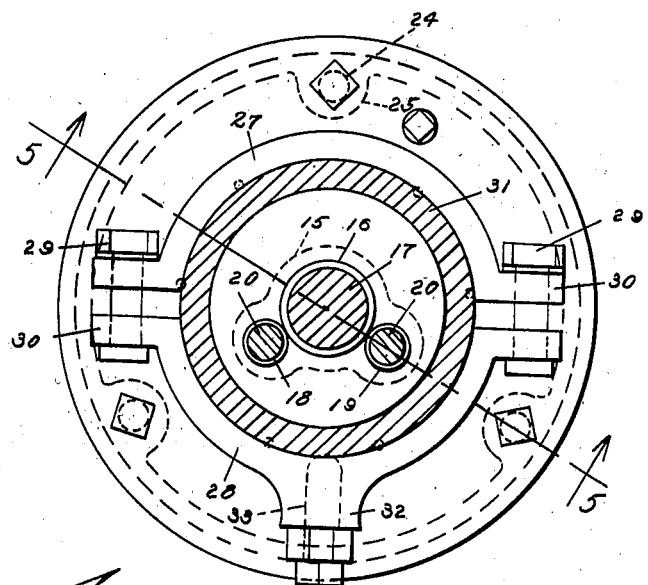
Fig. 3 is a top plan view of the guide as attached to the "mast pipe" of a windmill, the said pipe being shown in cross-section.

The cover 12 may have a collar 26 associated therewith and adapted to be attached to the lower end of a mast pipe 31, or similar member, from which the rod or cable proceeds. For this purpose, the collar may comprise a fixed portion 27 (Fig. 5) which may be formed integral with the cover 12 and a separate movable portion 28 of complementary formation these two parts adapted to embrace the end of the mast pipe. Parts 27 and 28 may be secured together and to the pipe 31 by means of bolts 29 (Fig. 3) passing through lateral extensions 30 formed on the collar members 27 and 28. In addition to the foregoing securing means, the movable collar member 28, as seen in Fig. 3, may be formed with a lug 32 adapted to receive a set screw 33 adapted to be tightened against the mast pipe 31.

The bottom 13 of the guide body 11 is provided, according to the present disclosure, with three pairs of legs 34, each pair adapted to support a roller. As seen particularly in Fig. 6, the legs are provided with transverse oppositely disposed bores 35 adapted to receive the ends of a shaft 36 upon which a roller 37 is fixed.

Figure 2:
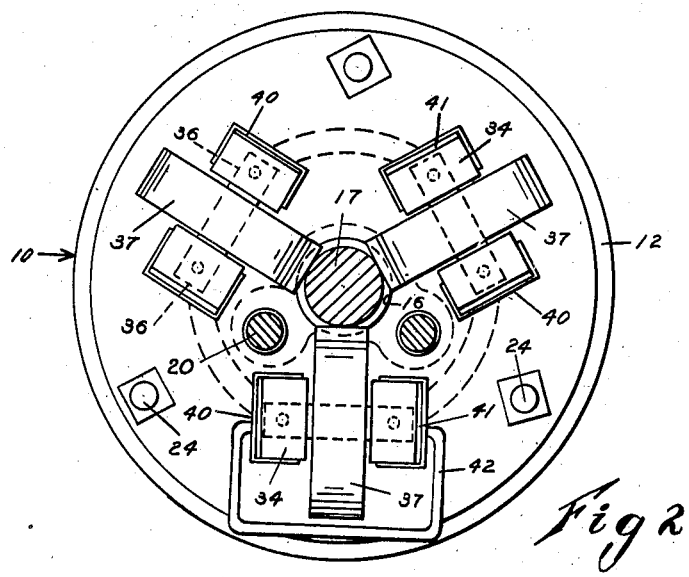
Fig. 2 is a bottom plan view of the guide having rod or cable means associated therewith.

It will be seen, particularly in Fig. 2, that the rollers are mounted in opposed relation and the rollers between them define a passage for the rod or cable, which passage is substantially concentric with but smaller than the bore 16 provided in the core 15 of the body 11. By this means, the rollers substantially eliminate frictional contact between the cable and the core 15 and cover 12 of the guide.

Inasmuch as the rollers 37 are intended to move with greatest freedom possible, it is desirable to provide constant lubrication therefor. For this purpose, the interior of the body 11 of the guide is formed for holding oil. The bottom 13 of the guide is provided with oil passages 38 which extend through the legs 34 into the bores 35 thereof and wherein the roller shafts 36 are journalled. The passages 38 are each adapted to receive a wick 39 which projects upwardly into the oil contained in the body 11. These wicks feed the oil through the said passages to the shafts 36 of the rollers which are thus constantly lubricated. In Figs. 2 and 6 there is likewise shown a plate 40 embracing the legs 34 and holding a pad 41 against the outer ends of the roller bores 35 for retaining the oil in said bores. The plates 40 may be additionally held in place by any suitable means such as a spring clip 42 (Figs. 2 and 6) pressing the plates 40 against the associated pads 41 for holding the latter in position. These means also serve as dust shields.

It is obvious that the guide of this invention may be utilized with any type or shape of rod, line, plunger or the like and that the rod or cable might extend in any direction, whether vertically, horizontally or angularly, without modifying in any way the effectiveness of the invention. Although the guide disclosed herein is shown as provided with three rollers, it will be apparent that a different number of rollers may be utilized in keeping with various diameters and shapes of cables or rods. Other structural modifications will be apparent upon consideration of the means herein described, but these are believed to be comprised within the spirit and scope of the invention.

What is claimed is:

1. The combination with a journal member having open end bores associated therewith for the reception of a shaft or the like, of means for lubricating and simultaneously dust-shielding said bores, said means comprising an oil pad disposed over the ends of the bores, a plate superimposed on the pad, and means holding the plate and pad in position, said means consisting of a spring clip substantially embracing the journal member and having its ends bearing resiliently against said plate.

2. A roller unit comprising a base formed with an oil supply reservoir provided with an outlet, a roller, a mounting for the roller on the base and formed with a conduit from the reservoir outlet to the roller, and an oil supply wick in the conduit with one end in the reservoir and the other end associated with the roller.

3. A roller unit comprising a base formed with an oil supply reservoir, a pair of mounting members on the base, an axis having its ends journaled in said mounting members, a roller fixed on said axis between the mounting members, the latter being formed each with a conduit extending from the reservoir to one end of the roller axis, and an oil supply wick in each of said conduits and having one end in said reservoir and the other end bearing against one of the journaled ends of said axis.

4. An anti-friction guide for a longitudinally movable rod or cable, said guide comprising a hollow base formed with a bored core for passage of the rod therethrough, a cover giving access to the hollow interior of the base, lugs formed interiorly of the base, said lugs and cover being formed with registering bolt holes for receiving bolts to hold the cover on the base, gasket means between the cover and the adjacent portions of the base, and bearings on the bottom of the base defining a rod passage concentric with the bore of said core, the stresses of the rod being transmitted through said bolt lugs and cover whereby cutting and abrasion of the gasket means is obviated.

5. A rod or cable guide comprising a hollow base forming an oil supply reservoir and apertured for the passage of the rod or cable therethrough, means for positive exclusion of oil from the rod aperture, bearings mounted on the exterior of the bottom of the base for cooperation with the rod or cable, and gravity oil feed means extending from the reservoir to the bearings.

6. A rod or cable guide comprising a hollow body forming an oil reservoir, a core formed in said body and provided with a bore for passage of the rod or cable therethrough, and means for applying oil in the reservoir exteriorly of said body for facilitating movement of the rod or cable.

7. A rod or cable guide comprising a hollow body forming an oil reservoir, a core extending through said body and provided with a bore for passage of the rod or cable therethrough, said bore having no communication with the interior of said body, and means for applying oil in the reservoir exteriorly of said body for facilitating movement of the rod or cable.

8. A self-lubricating rod or cable guide comprising a hollow body forming an oil reservoir, a core formed in said body and provided with a bore for passage of the rod or cable therethrough, bearings for the rod or cable on the bottom of said body exteriorly thereof, and communication means between the reservoir and bearings to effect gravity lubrication of the latter.

9. A self-lubricating roller unit comprising a hollow base forming an oil reservoir, a roller and mounting therefor on the lower portion of said base exteriorly thereof, and communication means between the reservoir and roller mounting to effect gravity feed of oil to the mounting.

10. The combination with a pair of mounting members formed with opposed open-end bores, of dust-excluding and lubrication means comprising a pad member disposed over the outer end of each of said bores, and a generally U-shaped spring clip embracing between its ends said mounting members and the pad members associated therewith for resiliently holding the latter in position.

WILLIAM NEAL EDWARDS.